United States Patent [19]

Ritchie et al.

[11] 3,754,866

[45] Aug. 28, 1973

[54] OPTICAL DETECTING SYSTEM

[75] Inventors: David Alan Ritchie; Richard A. Reeves, both of St. Louis, Mo.

[73] Assignee: Sherwood Medical Industries Inc., St. Louis, Mo.

[22] Filed: July 30, 1971

[21] Appl. No.: 167,377

[52] U.S. Cl.............. 23/253 R, 250/227, 356/39, 356/180, 356/184
[51] Int. Cl...................... G01n 21/24, G01n 33/16
[58] Field of Search...................... 23/253 R, 253 A, 23/259; 356/180, 181, 182, 183, 184, 185, 186, 39; 250/227

[56] References Cited
UNITED STATES PATENTS

| | | | |
|---|---|---|---|
| 3,062,963 | 11/1962 | Douty | 356/181 X |
| 3,554,654 | 1/1971 | Paatzsch | 356/180 |
| 1,792,046 | 2/1931 | Skaupy | 350/321 X |
| 3,607,099 | 9/1971 | Scordato | 23/253 R X |

Primary Examiner—Morris O. Wolk
Assistant Examiner—Sidney Marantz
Attorney—Axel A. Hofgren et al.

[57] ABSTRACT

A testing apparatus for automatically determining prothrombin times and other similar factor assays. A turntable conveyor moves successive blood plasma samples in containers to a test station where each sample is tested, pertinent information sensed and fed to a printer for readout. Preliminary to the testing station is a first reagent dispenser where a reagent is dispensed to each sample and a second reagent dispenser is located at the testing station for adding a second reagent. Intermediate the two reagent dispensers is a sample incubation device which intimately contacts each container to apply heat thereto to incubate the sample contained therein. Each reagent dispenser is provided with a reagent reservoir and associated magnetic stirring system. A unique system for decoupling the magnetic stirring system from a magnetic stirrer and moving the magnetic stirrer out of the path of a pipette forming part of each reagent dispenser is provided. At the testing station, a unique photosensitive detection device is provided for sensing the formation of clots after the second reagent is added.

10 Claims, 9 Drawing Figures

PATENTED AUG 28 1973
3,754,866
SHEET 1 OF 5
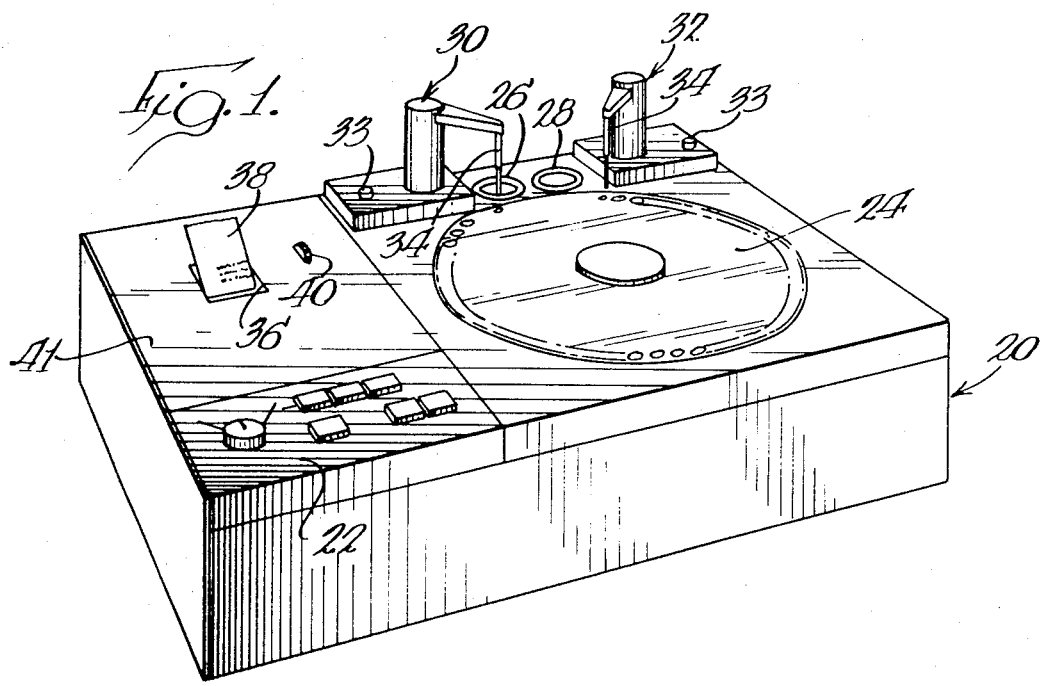
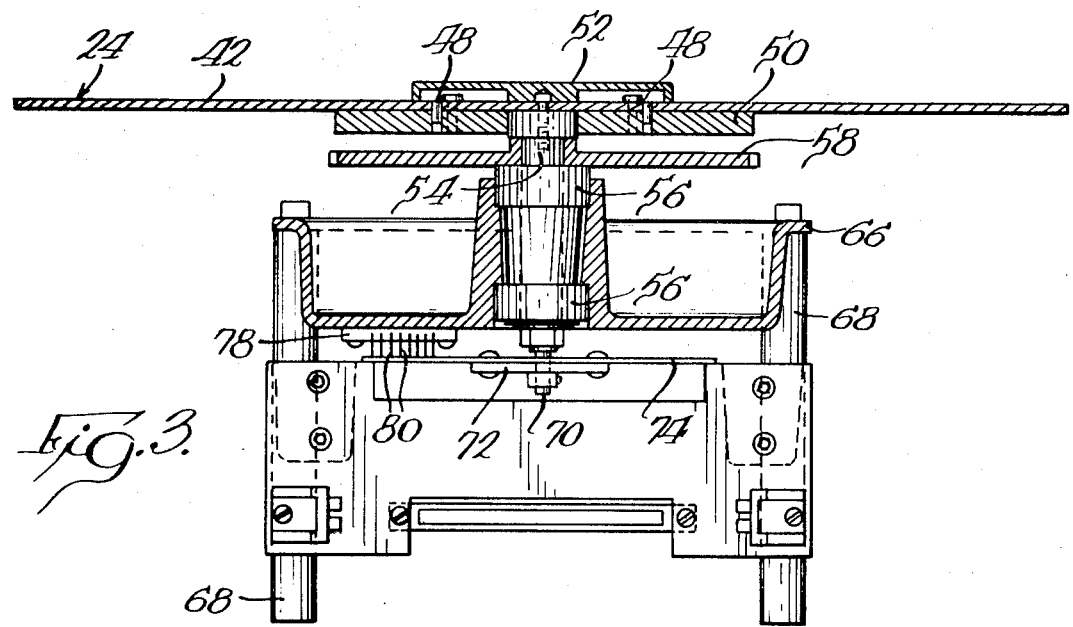
Inventors:
David A. Ritchie
Richard A. Reeves
By Hofgren, Wegner,
Allen, Stellman & McCord
Atty's

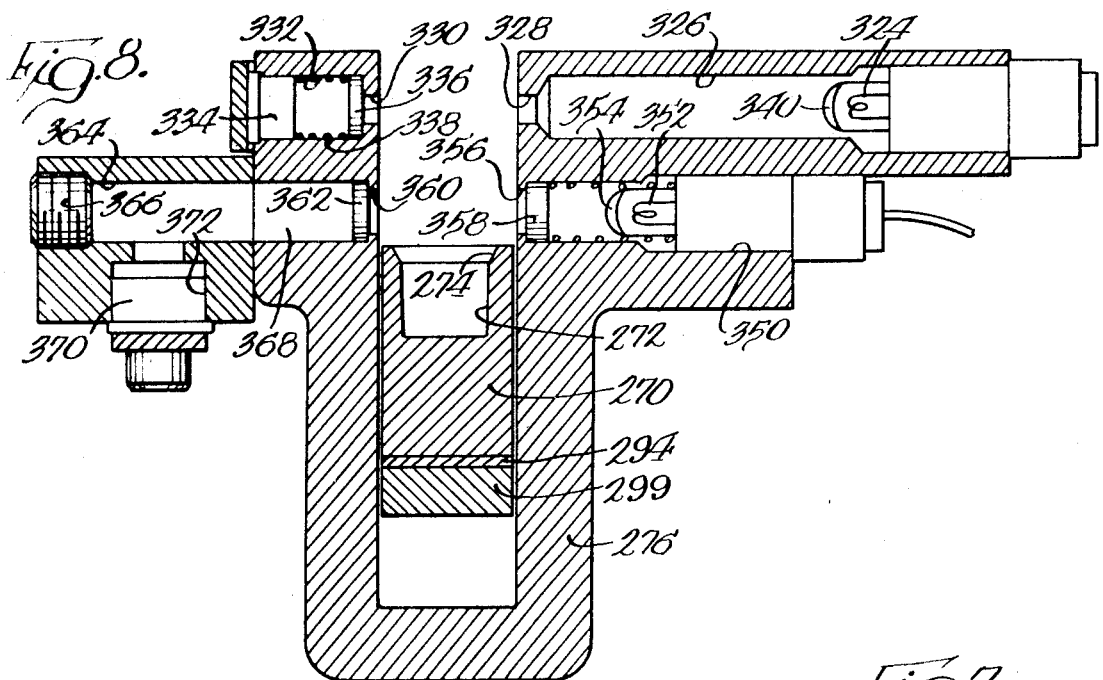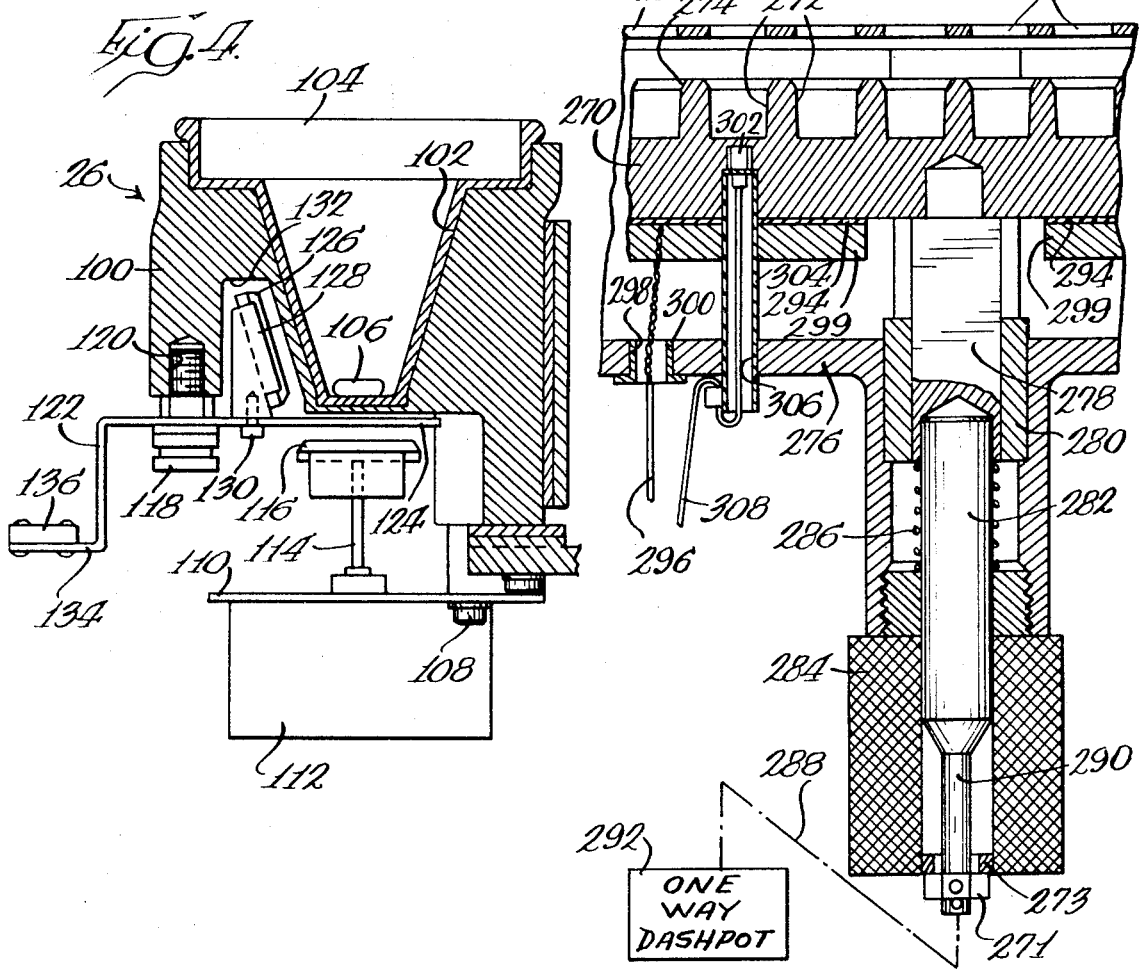

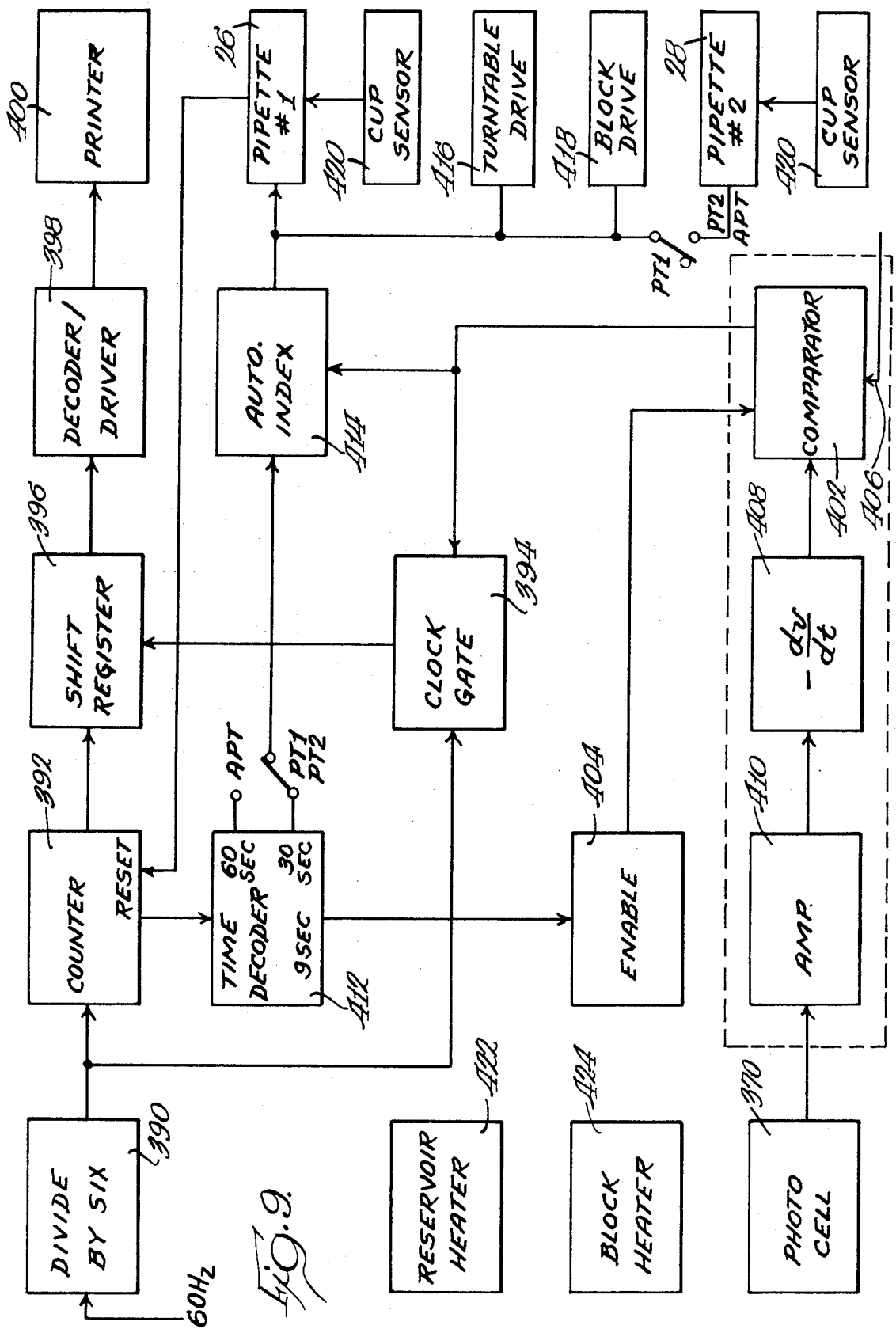

OPTICAL DETECTING SYSTEM

BACKGROUND OF THE INVENTION

This invention relates to medical testing devices and more particularly, to medical testing devices wherein a change in an optical characteristic of a sample is sensed, for example, in the determination of prothrombin times.

Increasingly, the population has relied upon competent medical assistance to solve individual medical problems to a greater and greater extent. This factor, coupled with the ever-growing wealth of medical knowledge, has resulted in a vast upsurge in the number of tests of various types performed as part of the diagnosis or health monitoring process and an increasing unavailability of competent personnel to perform such tests. As a result of the increase in demand for such services, the cost of performing the same has gone up as well. Thus, not only can it be difficult to obtain qualified personnel to perform such tests, but the costs of such services are oftentimes prohibitive and, even under the best of conditions, the human factor is generally present thereby raising the possibility the test will be improperly conducted or its results improperly determined.

As a result, there is an increasing need for apparatus for performing such tests in an inexpensive fashion, which apparatus can be operated by relatively unskilled personnel and which will eliminate most opportunities for unreliability of results due to human error.

SUMMARY OF THE INVENTION

The principal object of the invention is to provide a new and improved testing device for automatically performing tests on samples for the medical field. More particularly, it is an object of the invention to provide a testing apparatus that is particularly suited for automatically determining prothrombin times and other similar tests.

A further object of the invention is to provide a new and improved optical detection system for detecting an optical change in a sample; a new and improved sample incubation mechanism; a new and improved automatic reagent pipetting system; and a new and improved reagent reservoir and stirring system, all for use in various forms of testing apparatus.

The exemplary embodiment achieves the foregoing objects with a construction employing a sample conveyor in the form of a turntable which may receive a plurality of sample-holding containers and stepwise convey the same through a first reagent dispensing station, a sample incubation station; and a combined second reagent dispensing station and testing station. At the testing station, an optical detecting system is employed to determine optical changes in the sample as, for example, clot detection in a prothrombin test. The time required for such clotting after dispensing of a second reagent into the sample is then recorded and printed out on a printer.

The optical system at the testing station employs a light source on one side of the path of movement of the samples and a photosensitive element on the opposite side of the path. On the light source side there is provided a high-pass, red filter for the purpose of eliminating the effects of variations in optical absorption from one plasma sample to another. On the photosensitive element side of the path, there is provided a collimated hole structure to serve as a mask for light passing through the sample and a diffuser in the form of an elongated light pipe. The photosensitive element is arranged transverse to the direction of elongation of the light pipe and the system is generally insensitive to optical noise for increased reliability in accurate detection of optical changes.

The unique incubation means employed comprise an arcuate, heat-conductive block, formed of a material such as aluminum which is mounted for movement into and out of the path of movement of the sample containers. The block includes a plurality of recesses for receiving individual sample containers and has an electric heater associated with the same. A solenoid is employed to move the block into and out of the path of movement of the containers and is operated conjointly with an operating means for the turntable so that when the turntable operates to index the next sample to the testing station, the block is drawn out of the path until such indexing is completed whereupon it is permitted to move back into the path. In the path, the sample containers are received within the recesses in the block and uniformly incubated to a desired temperature.

The reagent pipetting system involves a pipette mounted on a rotary and reciprocating shaft for (1) rotational movement between a position overlying a sample container in the turntable and a position overlying a reagent reservoir, and (2) reciprocable movement between the last-named position and a position within the reservoir at which the reagent may be drawn into the pipette for subsequent dispensing into the sample. A piston pump is associated with the pipette and is operated by a cam to cause reagent to be drawn into the pipette when the pipette is in the reservoir and dispensed from the pipette when the pipette overlies a sample. The same cam is also operative to control movement of the pipette between the three above-mentioned positions by means of a follower connected to a level which in turn is connected to the shaft mounting the pipette to reciprocate the shaft. Another cam arrangement including a cam follower affixed to the shaft mounting the pipette and a stationary cam is responsive to reciprocation of the shaft to impart rotation thereto to ultimately move the pipette between the first two positions mentioned above.

The magnetic stirring system is particularly suited for operation in conjunction with the reagent type pipetting system. A reservoir in the form of an inverted, truncated cone is employed and beneath the bottom thereof, a movable magnet for establishing a movable magnetic field is provided so that a magnetic stirring bar within the reservoir will be moved to stir the contents of the same. Means are provided for disabling the moving magnetic field establishing means and for moving the magnetic stirring bar out of the path of the pipette as it descends into the reservoir and comprise a lever including a magnetic shield interposable between the movable magnet and the bottom of the reservoir to break the magnetic coupling between the movable magnet and the magnetic stirring bar. The lever also mounts a generally upright magnet which is moved to a position adjacent the reservoir to draw the magnetic stirring bar to the one side thereof. The lever is operated by a cam follower adapted to be engaged by an element movable with the shaft mounting the pipette as mentioned in the preceding paragraph.

Other objects and advantages of the invention will become apparent from the following specification taken in conjunction with the accompanying drawings.

DESCRIPTION OF THE DRAWINGS

FIG. 1 is a perspective of a testing device made according to the invention contained generally within a housing;

FIG. 3 is a vertical section taken of the sample conveyor;

FIG. 4 is a vertical section taken approximately along the line 4—4 of FIG. 2;

FIG. 7 is a vertical section taken approximately along the line 7—7 of FIG. 2;

FIG. 8 is a vertical section taken approximately along the line 8—8 of FIG. 2; and FIG. 9 is a block diagram of one form of a control system that may be employed in the invention.

DESCRIPTION OF THE PREFERRED EMBODIMENT

GENERAL DESCRIPTION

Figure 2:
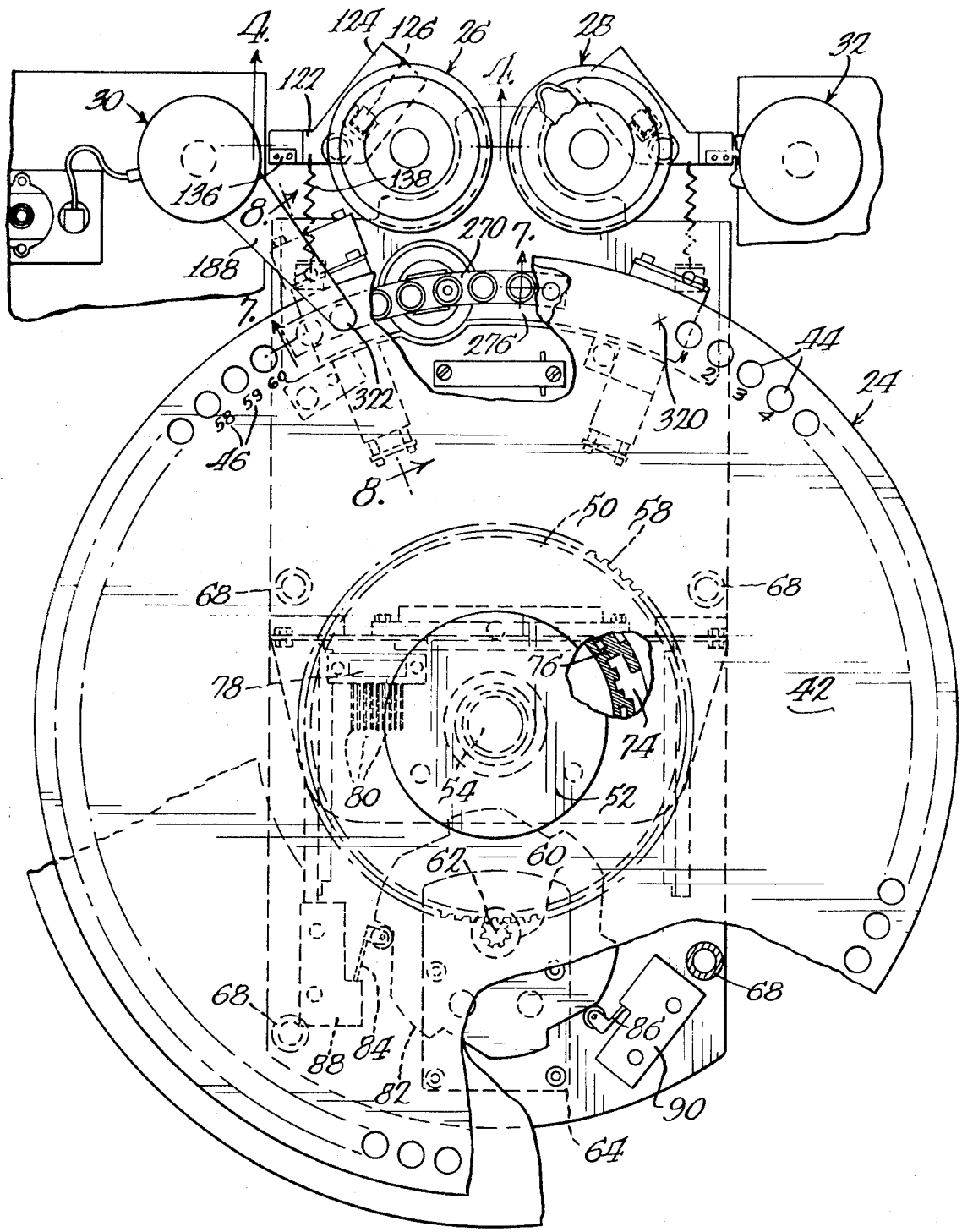
FIG. 2 is a plan view of the sample conveyor, two pipetting systems, two magnetic sitrring systems and the incubator block with parts broken away for clarity.

As generally alluded to previously, a testing device made according to the invention is ideally suited for performing and recording results of prothrombin tests or other similar tests, although it will be recognized by those skilled in the art that a goodly number of the various mechanisms and structures hereinafter described are susceptible to use in other testing devices or systems which perform tests totally different from prothrombin or related tests and, for that matter, with the non-chemical tests. Thus, while the invention will be described in conjunction with a prothrombin time test, it is to be understood that the same is not to be considered to be so limited except as expressly stated in the appended claims.

Prothrombin time tests measure the clotting time of blood plasma and may be of either the one reagent or two reagent variety. Specifically, in performing prothrombin time tests, a plasma sample has both calcium chloride solution and thromboplastin introduced into the same. In a one reagent test, the calcium chloride and thromboplastin are combined and a deisred amount of the combined mixture is introduced into the sample. For many purposes, a single reagent test is sufficient but where stability of the thromboplastin is of concern, as when the tests are performed relatively infrequently, or in large batches, it is desirable to maintain the thromboplastin and the calcium chloride solution separate to prolong the stable life of the thromboplastin.

As will be seen, the apparatus is ideally suited for either type of test but will be specifically described in conjunction with the two reagent test which requires a greater number of systems than does the single reagent test.

In particular, a conveyor is loaded with cuvettes containing the plasma samples to be tested and the conveyor is stepwise advanced automatically from a starting point to a first reagent dispensing station where the first reagent, at room temperature, is forcibly added to and thereby mixed with the sample. As the conveyor is stepwise advanced, each succeeding sample receives the first reagent at the reagent dispensing station while those samples having already received the first reagent are advanced to an incubating station where each sample is heated to a predetermined station which coincides with a testing station. As each sample reaches the second reagent dispensing station, the second reagent, heated to the desired incubation temperature, is forcibly added to and thereby mixed with that sample and a clock started. Upon a change in the optical density of the sample due to the formation of fibrin strands, an optical detecting system detects the change and stops the timing device whereupon the results are printed out and the turntable indexed for testing of the next succeeding sample. The optical detecting system is disabled for an initial period so as to overlook optical turbulence created by forcible injection of the reagent.

DETAILED DESCRIPTION

Housing Structure

An exemplary embodiment of a testing device made according to the invention is illustrated in FIG. 1 and is seen to comprise a housing, generally designated 20, having a control panel 22. A turntable conveyor 24 is generally flush with the upper side of the housing 20 and is employed to advance a series of samples through the various stages mentioned previously in a stepwise fashion as will be seen. The upper side of the housing 20 also mounts a pair of reservoirs 26 and 28, each of which is adapted to receive a different one of the reagents employed in a two reagent test.

Associated with each reservoir is a corresponding reagent pipetting system, generally designated 30 and 32, respectively, each including a volume adjustment knob 33 and a pipette 34.

The housing 20 is completed by a cutout 36, in a pivotal door 41 from which a results tape bearing the printed results of tests may emerge. A manual operator 40 for the tape 38 is also provided. The door 41 may be opened for replacement of the tape 38.

Conveying System

Referring now to FIGS. 2 and 3, the turntable 24 is formed of a disc 42 having a plurality of apertures 44 about all but about 60 degrees of its periphery. According to one embodiment of the invention, 60 of the apertures 44 are provided and the disc 42 is provided with indicia 46 identifying each aperture 44. The apertures received cuvettes containing the sample to be tested.

The disc 42 is secured by means of screws 48 to a mounting plate 50 underlying the disc 42 and is provided with a cap 52 for covering the screws 48. The resulting assemblage is secured to a shaft 54 which is journalled in bearings 56 and mounts a large, driven gear 58 in engagement with a small, drive gear 60 (FIG. 2) mounted on the output shaft 62 of an electric motor 64 having a built-in gear reduction system. The arrangement is such that energization of the motor 64 will ultimately cause the disc 42 to be rotated in a counterclockwise direction as viewed in FIG. 2.

The bearings 56 are mounted in the central aperture of a mounting platform 66 which is elevated above the bottom of the housing 20 by posts 68. A portion of the shaft 54 extends through the lowermost one of the bearings 56 and provides a shaft extension 70 of reduced diameter. The reduced diameter shaft 70 has secured thereto, a hub 72 which in turn mounts an encoder plate 74 having printed circuit segments 76 (FIG. 2) on its upper surface. The encoder plate 74 rotates with the turntable 24 and by configuring the printed circuit segments 76 in a manner known in various arts, a binary coded signal may be obtained from the same which is indicative of the particular one of the apertures 44 located at the testing station for correlation of sample number with test times. To this end, the underside of the platform 66 mounts an insulating bracket 78 which, in turn, mounts a plurality of depending electrical brushes 80 which engage the printed circuit segments 76 for picking off sample position information for employment elsewhere in the system to correlate the results with sample number.

In addition to the drive gear 60, the motor shaft 62 mounts a timing cam 82 configured substantially as shown in FIG. 2 and which is in engagement with switch operators 84 and 86 of microswitches 88 and 90 respectively. The microswitch 88 may be employed in a conventional motor control system for maintaining energization of the motor 64 when its operation has been initiated by the completion of a test, or by manual means, and for terminating energization of the motor 64 when the next cuvette has been moved to the testing station. Microswitch 90 may be employed in a conventional motor control system for initiating pipette operation as sample cuvettes move beneath pipette stations.

Reagent Reservoir and Magnetic Stirring System

A preferred form of reagent reservoir and magnetic stirring system is illustrated in FIGS. 2 and 4 and will now be described. As stated previously, two such systems 26 and 28 are employed and the two are identical with the exception that one is the mirror image of the other and the reagent reservoir 26 is equipped with a heating element and control therefor (not shown) for maintaining the contents of the reservoir at a desired temperature.

More particularly, the reagent reservoir and magnetic stirring system 26 includes a reservoir block 100 having an inverted, frustoconical recess 102 in its upper surface. The recess 102 is adapted to receive a similarly configured reagent cup 104 which may contain a reagent and which, in turn, may receive a magnetic stirring bar 106 which may be coated with Teflon or the like to insure inertness with respect to a reagent within the reservoir.

Mounted on the underside of the block 100 by means of cap screws 108 and a mounting bracket 110 is an electrical motor 112 having a rotary output shaft 114 which mounts a permanent magnet 116 for rotation just below the bottom of the recess 102. As is wellknown, when the motor 112 is energized, the resulting rotation of the magnet 116 will establish a moving magnetic field within the recess 102 which, in turn, will cause the magnetic stirring bar 106 to rotate to stir the contents of the same.

As mentioned generally previously, the pipettes 34 are adapted to be moved into the respective one of the reservoirs 26 and 28 for the purpose of withdrawing reagent from the same and conveying the reagent to a point of use whereat it may be discharged into a sample-containing cuvette in the turntable 24. In order to minimize the amount of reagent required in a reservoir sufficient to permit automatic operation of the pipetting systems, and to promote maximum stirring efficiency, the reservoir recesses 102 are frusto-conical as mentioned previously. However, the presence of the magnetic stirring bar 106 in the reservoir will not permit the pipette 34 to fully move to the bottom of the reservoir without interference that could possibly damage the pipette. While the possibility of such interference could be precluded by limiting the downward movement of a pipette 34 into the reservoir, such would require the use of more reagent than necessary in order to maintain the level in the reservoir at a sufficient height so as to be reachable by the pipette 34.

Accordingly, means are provided for simultaneously decoupling the movable magnet 116 and the stirring bar 106 while drawing the latter to a position adjacent the side of the reservoir when the pipette 34 is entering the latter. As viewed in FIGS. 2 and 4, a pivot stud 118 is received in a bore 120 in the block 100 and mounts a lever 122 for pivotal movement about a vertical axis at a height wherein a magnetic shield 124 integral with the lever 122 may be interposed between the bottom of the reservoir and the movable magnet 116. The shield 124 breaks the magnetic coupling between the magnet 116 and the magnetic stirring bar 106 so that the latter will cease to rotate with the magnet 116.

The lever 122 also mounts a generally upstanding magnet 126 by means of a bracket 128 and a screw 130 for movement to a position in a notch 132 adjacent one side of the recess 102. Thus, when the magnetic coupling between the magnet 116 and the magnetic stirring bar 106 is broken by the interposition of the shield 124, the magnet 126 will simultaneously establish a stationary magnetic field within the reservoir 102 which will draw the magnetic stirring bar to the side of the reservoir and hold the same stationary so that a pipette 34 may move into the reservoir to the bottom thereof during the reagent withdrawing process.

Control of the position of the lever 122 is obtained by means of a cam follower extension 134 mounting a wear piece 136 which may be engaged by a cam element movable with the pipette as will be described in greater detail hereinafter. With reference specifically to FIG. 2, and particularly to the system 26, when the pipette system 30 is activated to move its respective pipette 34 to a position overlying the reservoir 26, a cam associated therewith will engage the wear piece 136 to cause the lever 122 to pivot in a clockwise direction to interpose the shield 124 between the magnet 116 and the magnetic stirring bar 106 and simultaneously position the magnet 126 to pull the stirring bar 106 to the side of the reservoir. When the pipetting system 30 has withdrawn a reagent from the reservoir and returned to the position illustrated in FIG. 2, a spring 138 returns the lever 122 to the position illustrated in FIG. 2 with the result that stirring will once again be resumed.

Reagent Dispensers

Figure 5:
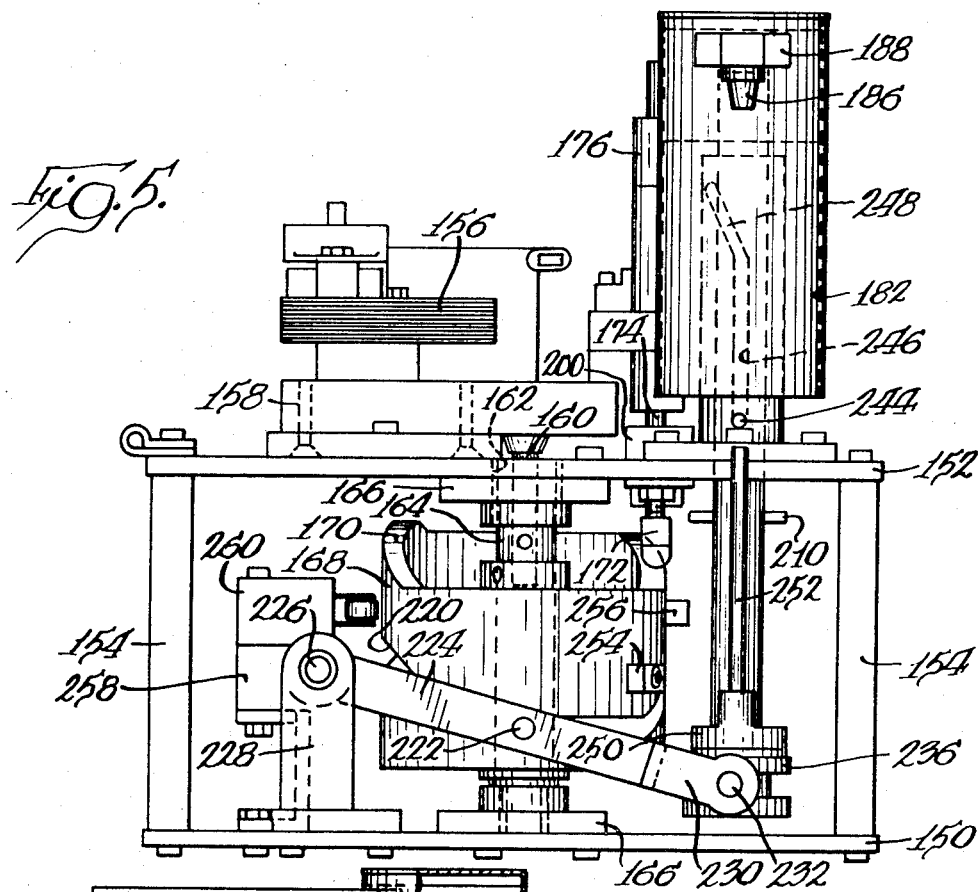
FIG. 5 is a side elevation of a reagent pipetting system.
Figure 6:
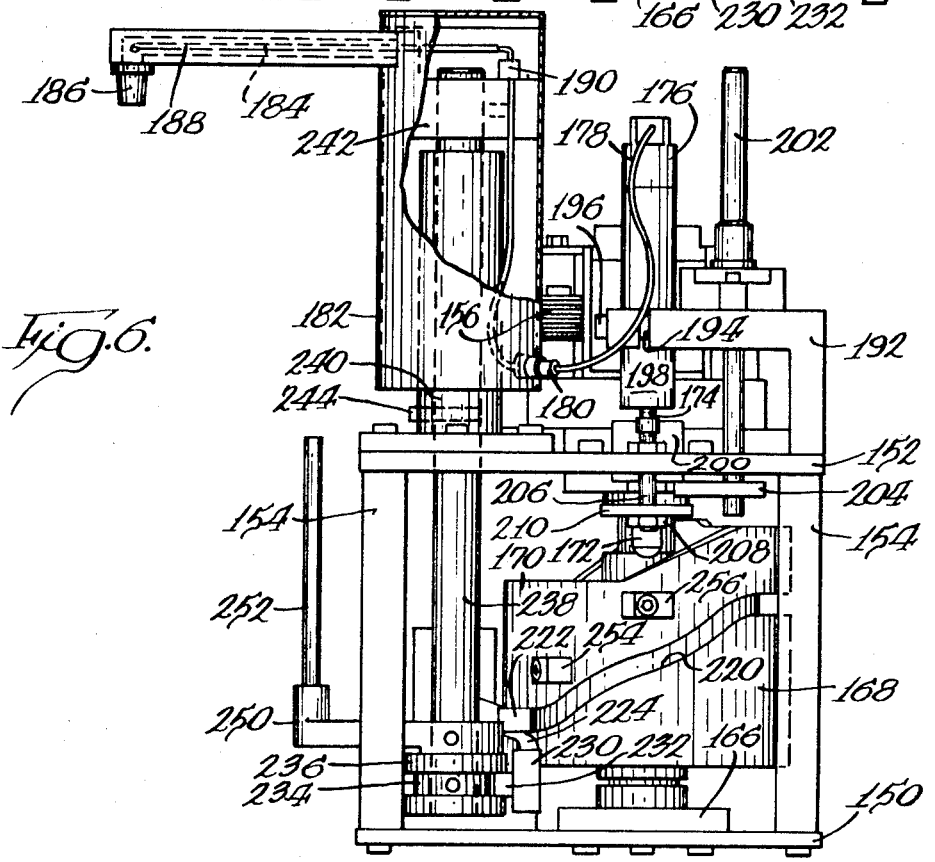
FIG. 6 is a side elevation of the reagent pipetting system taken at approximately 90° to the showing in FIG. 5.

The reagent dispensing system may best be understood with reference to FIGS. 2, 5 and 6. As mentioned previously, two such systems 30 and 32 are provided and each is identical to the other with the exception that one is a mirror image of the other. With reference specifically to FIGS. 5 and 6, each reagent dispenser is seen to comprise a base 150 mounting an elevated mounting plate 152 by means of spacing posts 154. The mounting plate 152, in turn, mounts an electric motor 156 having a reduction gear train 158 operatively associated with its output shaft. An output shaft 160 of the reduction gear train 158 extends through a bore 162 in the plate 152 downwardly to a cam shaft 164. The cam shaft 164 is journalled for rotation between the base 150 and the mounting plate 152 by means of bearings 166 and mounts a barrel cam 168.

The barrel cam 168 includes two cam surfaces for operating a pump for the reagent dispenser and for moving a pipette associated therewith between a first position wherein the same overlies a sample-holding container or cuvette in the turntable, a second position wherein the pipette overlies the associated reservoir, and a third position wherein the pipette is within the reservoir. More particularly, the barrel cam 168 is generally cylindrical and includes a peripheral, first cam surface 170 on its upper end which is adapted to cooperate with a cam follower 172 mounted on the lower end of a shaft 174 of a piston pump 176.

The piston pump 176 may be of conventional construction and of the type wherein the shaft 174 is spring-urged downwardly so that when the shaft 174 is moved upwardly by the cam surface 170, material in the system will be expelled while when the shaft 174 is permitted to move downwardly by reason of the biasing of the internal spring, material may be drawn into the pipetting system.

To the foregoing end, the upper end of the pump 176 is in fluid communication with a flexible tubing 178 which may be formed of polyvinyl chloride or the like and which passes through a grommet 180 into an inverted can-like structure 182. Near the upper end of the can-like structure 182 there is provided an outwardly extending arm 184 terminating in a downturned connector 186 to which one of the pipette tips 34 may be secured. Within the arm 184 is a conduit 188, which, by means of a connector 190 provides for fluid communication between connector 186 and the tubing 178. Thus, when a pipette associated with the arm 188 is within the reservoir and the pump shaft 174 moves downwardly, reagent will be drawn into the same while when a pipette associated with the arm 188 is overlying a sample-containing cuvette on the turntable 24 and the pump shaft 174 is moved upwardly, reagent within the pipette will be expelled into the cuvette.

In order to insure that a proper quantity of reagent is accurately delivered, adjustment means for controlling the permissible stroke of the pump shaft 174 are provided. Since prothrombin tests may frequently be performed employing 0.1 ml of reagent or 0.2 ml of reagent, means are provided for independently adjusting the stroke of the pump shaft 174 between two positions for the two corresponding quantities.

More specifically, an L-shaped bracket 192 is secured to the upper surface of the mounting plate 152 and includes a keyhole slot 194 which receives the pump 176. To tightly secure the pump at a desired attitude with respect to the bracket 192, a cap screw 196 may be employed to tightly close the confines of the slot 194 about the periphery of the pump 176 to hold the same in position.

Mounted on the shaft 174 of the pump 176 intermediate the cam follower 172 and the lower end 198 of the pump is an adjustable collar 200. The collar may be secured at a desired location on the shaft 174 by means not shown.

The L-shaped bracket 192, in addition to the pump 176, mounts a rotatable shaft 202 on which the volume control knob 33 may be received. The lower end of the shaft 202 extends through an appropriate bore in the mounting plate 152 and mounts a laterally projecting stop arm 204. The arrangement is such that for one position of rotation of the shaft 202, the arm 204 will be in the path of the collar 20 to restrict downward movement of the shaft 174 under influence of the internal spring of the pump 176. Thus, for purposes of securing a 0.1 ml delivery of reagent, the collar 200 may be so located on the shaft 174 that the stroke applied to the shaft 174 by the cam surface 170 will deliver the appropriate volume.

For another position of rotation of the shaft 202, the stop arm 204 will not interfere with downward movement of the collar 200 to permit a delivery of a greater volume of reagent, as for example, the previous mentioned 0.2 ml. To control the precise volume of such a larger delivery, a second adjustable mechanism is provided. Specifically, to one side of the shaft 174, there is provided a threaded bore in the plate 152 which may receive a cap screw 206. Near the lower end of the cap screw 206, there is provided a nut 208 mounting a stop disc 210 having a diameter sufficiently great that it will interfere with downward movement of the collar 200 as best illustrated in FIG. 5. Thus, by appropriately adjusting the cap screw 206 and thus the position of the stop disc 210, a second, greater delivery may be precisely controlled.

Returning to the barrel cam 168, the same includes a second cam surface in the form of a cam track 220 receiving a cam follower 222. The cam follower 222 is secured to a lever 224 intermediate its ends. As best viewed in FIG. 5, the left-hand end of the lever 224 is pivotally mounted by means of a pin 226 in an upstanding yoke 228 secured to the base plate 150. The opposite end of the lever 224 terminates in a yoke 230 having inwardly projecting pins 232 (only one of which is shown) received in a groove 234 in a spool-like structure 236. The spool-like structure 236 is, in turn, secured to the lower end of a shaft 238 which passes upwardly through a bore in the plate 152 to be slidably received in an upstanding sleeve 240 secured to the mounting plate 152. The upper end of the shaft 238 extends through the sleeve 240 to be received in a mounting bracket 242 secured within the can-like structure 182. Bracket 242 is secured to pipette arm 188 and is vertically and angularly adjustable on shaft 238 to accurately position the pipette with respect to the reagent reservoirs and sample cuvettes. As a result, rotation of the barrel cam 168 will impart oscillatory movement to the lever 224 about the pivot 226 which will result in reciprocation of the shaft 238 within the sleeve 240 to ultimately move a pipette 34 secured to the arm 188 upwardly and downwardly as, for example, into and out of a reagent reservoir.

To cause movement of the pipette from a position overlying a cuvette on a turntable to the position overlying the reservoir, a cam system including the sleeve 240 is provided to be responsive to the reciprocatory motion of the shaft 238. As seen in FIGS. 5 and 6, an outwardly extending pin 244 is secured to the shaft 238 and is received in a generally vertically arranged slot 246 in the sleeve 240. The upper end of the slot 246 terminates in an angular extension 248 with the result that when the pin 244 is moved upwardly into the extension 248, the shaft 240, and thus the arm 188 will pivot from a position overlying the reservoir to a position overlying a cuvette. Of course, when the pin 240 moved downwardly in the slot, the pivoting action will be the reverse.

To insure cooperation of the reagent dispensers and the reagent reservoir and stirring system, an outwardly extending arm 250 is secured to the shaft 238 for rotation therewith. Extending upwardly from the arm 250 is a cam arm 252 which is adapted to abut the wear piece 136 on the lever 122 controlling the magnetic stirrer. The arrangement is such that during initial downward movement of the pin 244 within the slot 248 as the pipette moves from the first position overlying the cuvette to the second position overlying the reagent reservoir, the simultaneous pivoting of arm 250 will cause the cam arm 252 to engage the lever 122 and pivot the same to a position wherein the magnetic stirrer is rendered inoperable and the stirring bar is drawn to the side of the reservoir.

The dispensing system is completed by a pair of cams 254 and 256 on the cylindrical periphery of the barrel cam 168 which are adapted to respectively engage the actuators of microswitches 258 and 260 respectively. Microswitch 258 is part of a conventional control circuit for the motor 156. That is, once the motor 156 is energized by the remainder of the system, and assuming that a cuvette is present at a dispensing station, the microswitch 258 may be employed to maintain energization of the motor after once being initially energized and for terminating operation of the motor 156, respectively, once the same has caused the barrel cam 168 to rotate through a complete revolution. Microswitch 260 provides an electrical pulse to signal completion of the pipetting cycle and start of the test counter as it operates on cam 256.

Incubating System

The incubation system may be understood with reference to FIGS. 2, 7 and 8 and is seen to include an elongated, heat-conductive block 270 which may be formed of a material such as aluminum. Because of the circular nature of the path through which the sample-holding cuvettes are moved, the block 270 is arcuate as best seen in FIG. 2 and as illustrated in FIG. 7, includes a plurality of upwardly opening recesses 272 underlying the disc 42 comprising the turntable 24. The recesses are configured to snugly receive the lower end of a sample-containing cuvette and to insure easy register, are provided with outwardly flared upper ends 274.

The block 270 is received in a channel-like casting 276 for up and down movement therein. That is, during rotation of the turntable 24, the block 270 is moved downwardly within the channel so that sample-containing cuvettes may freely pass over the upper surface of the block 270 while when the turntable 24 is motionless, the block 270 is moved upwardly so that cuvettes are received within the recesses 272 for incubation. To achieve such movement, the center of the block 270 includes a downwardly extending shaft 278 which passes through a bushing 280 to be connected to the armature 282 of a solenoid 284. The arrangement is such that when the solenoid 284 is operated, its armature 282 will be moved downwardly from the position illustrated in FIG. 7 to move the block 270 downwardly. To return the block 270 to its elevated position, a coil spring 286 surrounds the armature 282 to provide an upward biasing force against the shaft 278.

Accurate adjustment of block 270 to its proper elevated position is accomplished through movement of an adjustable stop collar 271 on shaft extension 290. Stop collar 271 is of large enough diameter to prevnt its passage through the hole of bushing 273 on solenoid 284. Thus when stop collar 271 is fixed to shaft extension 290 with a set screw, upward travel of block 270, when returned by spring 286, is limited by stop collar 271 as it comes into contact with bushing 273. With block 270 adjusted to its proper elevated position, recess 272 at test location 322 is positioned so that when a sample cuvette is contained therein, that sample cuvette is slightly lifted off the surface of disc 42. For this purpose, the recess 272 at test location 322 is not as deep as the remaining recesses to lift the cuvette off of turntable 42 only at station 322.

Lifting the sample cuvette off the surface of disc 42 mechanically isolates the cuvette from the disc 42 and prevents movement or mechanical shock transmitted to the disc 42 from being conveyed to the sample cuvette, which may cause optical density variations in the detection system.

When the block 270 is to be moved downwardly and out of the path of movement of the cuvette, it is desirable that such action be accomplished rapidly while when movement in the opposite direction to engage cuvettes is desired, it is preferable that such movement occur at a significantly lesser rate so that upward movement of the block 270 will not cuase the same to slam against the undersides of cuvettes supported by the turntable 24. To this end, any suitable linkage such as that illustrated schematically at 288 connects the lower end of an extension 290 of the solenoid armature 282 to a one-way dashpot 292 of conventional construction. That is, the dashpot 292 will conventionally include a check valve operatively associated with a compression chamber while the linkage 288 will be connected to a piston of the dashpot so that upon downward movement of the piston within the chamber, gas will not be compressed, but rather, will be permitted to freely exit the chamber through the check valve. However, during upward movement of the piston by reason of the biasing of the spring 286, the check valve will close and gas flow into the chamber will be restricted by a bleeder line, generally adjustable, so that a partial vacuum will exist to retard the rate of upward movement. The slower rate of upward movement precludes slamming as mentioned previously and insures accurate registry of the bottoms of each cuvette with the respective recesses 272.

To impart heat to the samples via the block 270, silicone rubber strip heating elements 294 are secured to the underside of the block 270 and are provided with electrical current by leads 296 (only one of which is shown) extending upwardly to the heaters 294 through a bore 298 electrically isolated by a grommet 300. Sponge pads 299 are interposed between heaters 294 and casting 276 to thermally insulate the casting and provide additional damping when the block 270 contacts casting 276.

To accurately control the temperature of the block 270 so that the samples may be incubated to a predetermined desired temperature, a typical temperature sensing element such as a thermister 302 is mounted in the block 270. Extending downwardly from the block 270 is a lead protecting tube 304 which slidably passes through a bore 306 in the casting 276 and which houses electrical leads 308 for connection to a contorl circuit for the strip heaters 294.

As illustrated in FIG. 7, a plurality of the recesses 272 are provided with the number being sufficient in conjunction with the residence time of a particular sample at any one of the points to which it may be moved by the turntable 24 to insure that each sample is brought up to the desired incubation temperature before it is advanced to the testing station.

Testing Station and Cuvette Sensors

The nature of the testing station as well as cuvette sensors may be ascertained from FIGS. 2 and 8. With regard first to the cuvette sensors, it should be noted that at two stations designated 320 and 322 respectively in FIG. 2, reagents may be added to cuvettes. Of course, if a cuvette is not present, the reagent should not be dispensed and to this end, each of those stations is provided with a cuvette sensor. As illustrated in FIG. 8, each cuvette sensor includes a light source 324 received in a horizontally extending bore 326 in the casting 276 which terminates in a small, horizontally directed opening 328 confronting the channel defined by the casting 276. Aligned with the opening 328, but on the opposite side of the channel therefrom is a similar opening 330 confronting a bore 322 which is closed by a photosensitive element such as a photosensitive resistor 334. Interposed between the aperture 330 and the photosensitive element 334 is a collimated hole structure 336 (commercially available from the Brunswick Corporation) which is held in place against the end of the bore 332 by a small coil spring 338 interposed between the photosensitive element 334 and the collimated hole structure 336.

The collimated hole structure 336 is a small cylindrical disc having a plurality of very small openings passing through the same in a direction generally parallel to its cylindrical axis. For example, a disc a quarter inch in diameter may have as many as 5000 such passages extending through the same. The purpose of the same is to serve as a mask for the photosensitive element 334 so that the same will not improperly sense a change in light condition due to changes in ambient light. That is, the collimated hole structure 336 will preclude light rays not nearly parallel such as those emanating from substantially any source but the lamp 324 from passing to the photosensitive element 334. To further insure accurate detection, the lamp 324 may be of the type having a lens 340 integral with its envelope for insuring that substantially parallel rays of light are directed toward the collimated hole structure 336 and the photosensitive element 334.

To provide for cuvette detection, the upper ends of the cuvettes may be frosted so as to scatter light emanating from the source 324 and preclude its passage to the photosensitive element 334. Thus, a condition of low illumination of the latter will be indicative of the presence of a cuvette. On the other hand, when no cuvette is present, light will freely pass to the same and substantial illumination of the photosensitive element 334 will be taken as an indication that no reagent should be dispensed. Through appropriate interlock control circuitry of a conventional nature, the indications of the photosensitive elements 334 may be taken to inhibit operation of their associated reagent dispenser.

With regard to the testing station, the same exists only at the point 332 and is also illustrated in detail in FIG. 8. In particular, at the point 322, the casting 276 is provided with a second light source receiving bore 350 which may receive a light bulb 352 again of the type having a lens 354 integral with its envelope for providing a source generating substantially parallel rays of light in the beam emanating therefrom. The bore 350 terminates in an opening 356 of slightly decreased diameter and interposed between the opening 356 and the light bulb 352 is a high-pass filter 358. In the case of prothrombin time tests, the filter 358 will typically be red and of a type that will not permit the passage of wave lengths below 600 nanometers so as to eliminate in results, the effects of variations in individual blood plasma.

Aligned with the opening 356 but on the opposite side of the channel is a similar opening 360 and a second collimated hole structure 362. The collimated hole structure 362 is received in a bore 364 which is plugged at one end as at 366 and which includes a diffuser in the form of a section of light pipe 368. The function of the collimated hole structure once again is to prevent improper detection of a change in light condition due to changes in ambient light. A photosensitive element 370 again, preferably a photosensitive resistor, is received in a bore 372 that is transverse to the bore 364 so that the photosensitive element 370 is exposed to a side of the light pipe 368. The purpose of the foregoing arrangement is to preclude localized variations in the total beam of light passing through a sample from resulting in an erroneous judgment of clotting. For example, a photosensitive resistor such as at 370 will typically have a light sensitive surface made up in the form of a gridwork. If a particle within the sample were to become interposed between the light source and a line on the gridwork of the photosensitive element 370, a much larger variation in the electrical output characteristics of the element 370 would result than if the same were subjected to a diffused beam when the light sensed would be the average of that passing through the sample, as provided by the light pipe 368.

Control System

The control system for the testing device is illustrated in simplified block form in FIG. 9 as illustrative of one type of control system that may be employed. The same employs basic logic techniques known in a variety of electronic arts and therefore will only be functionally described, it being within the skill of the art to provide actual circuitry to perform the specific functions noted.

A conventional divide by six circuit 390 receives a conventional 60 Hertz line signal to provide a ten pulse per second output to both a counter 392 and a clock gate 394. In addition, the signal taken as, for example, from one of the microswitches associated with the first pipette system 26 is provided to the counter 392 for reset purposes. That is, the arrangement is such that when the first pipette system 26, which, it will be recalled, is at the testing station, delivers reagent to a sample, the counter 392 will be reset. At this time the pulses provided by the divide by six circuit 390 will cause the counter to begin to count until such time as it may be halted whereupon the count contained therein will be indicative of the clotting time of a sample in tenths of a second. The count from the counter 392 is loaded into a shift register 396 which is shifted by pulses passed by the clock gate 394 when enabled to in turn load a decoder driver 398 of conventional construction which, in turn, drives a printer 400 for printing the results on the tape 38.

While not illustrated in FIG. 9, the brushes 80 associated with the printed circuit segments 76 may also provide an input to the shift register 396 for indicating sample number so that results may be correlated with the sample number and printed out.

According to one embodiment, the counter 392 comprises a four decade binary coded decimal counter providing a count of up to 999.9 seconds although significantly less capacity will normally be the maximum required. The shift register 398 may comprise 32 bits in all with the first eight bits being employed for sample number information, the next four bits employed to provide a space in the printed results between sample number and clotting time, the next 16 bits for the clotting time and the last four bits to provide a print command.

As a result, when clotting has occurred, the shift register will already contain clotting time information as well as sample number and upon the clotting, the enabling of clock gate 394 will result in the shifting of the contents of the shift register 396 into the decoder driver with the last four bits of information providing a print command to the printer 400.

The clock gate 394 is enabled by the output of a comparator 402. The comparator 402 is provided with enabling input from an enabling gate 404 as well as a reference signal on a line 406 and a testing input signal from a differentiating circuit 409. The differentiating circuit receives its input from an amplifier 410 which, in turn, is driven by the photosensitive element 370 (FIG. 8). As a result of the foregoing, it will be appreciated that the comparator 402 will compare an input voltage proportional to the rate of change of the output signal from the photocell 370 to the reference signal with the result that when the total change is greater than the reference voltage, the readout process will begin. Because the system looks at the rate of change rather than a change from one level to another, variations from one plasma to another as well as possible variations in line voltage are minimized to provide more consistent results.

The counter 392 also provides an output signal to a time decoder 412. The latter includes one output to the enabled gate 404 to cause the latter to enable the comparator approximately 9 seconds after a reagent has been dispensed into a sample at the testing station. The purpose of this arrangement is to preclude the comparator from reacting to changes or turbulence caused when the reagent is introduced into the cuvette at the testing station.

In addition, the time decoder provides at least two different time outputs including a thirty second output to an automatic indexing control circuit 414. The latter also receives an input signal from the comparator 402 and the arrangement is such that the indexing circuit 414 will cause indexing of the turntable every 30 seconds or whenever a clot is detected, whichever takes longer. To this end, the indexing circuit includes an output to a turntable drive circuit 416 to initiate operation of the same whereafter it is controlled by the microswitches previously described; and to a block drive system 418 for controlling the position of the incubation block relative to the path in which the cuvettes move. In addition, the indexing circuit 414 provides signals to the pipette systems 26 and 28 to enable the same to dispense reagent to a cuvette when movement of the turntable has ceased. Such a dispensing command from the indexing circuit 414 may be overridden if associated cuvette sensing circuits 420 fail to detect the presence of the cuvette in the manner mentioned previously.

Finally, the system is completed by a reservoir heater 422 for the dispensing system 26 and a block heater 424 for the incubation block as generally mentioned previously.

From the foregoing, it will be appreciated that a testing device made according to the invention provides for virtual full automation of certain types of medical tests and minimized the need for trained personnel to run such tests. Additionally, the system provides for accurate testing along with increased reproducibility of results.

We claim:

1. An optical detecting system for a testing device comprising: means defining a path along which successive samples to be tested may be moved during a testing process; means for moving a plurality of samples successively along said path; means at at least one location along said path for adding a reagent to each sample to initiate a test; and means for detecting an optical change in a sample addition of the reagent, said detecting means comprising a light source on one side of said path, photosensitive element on the other side of said path for sensing light passing through a sample, light collimation means interposed between said light source and said photosensitive element on one side of said path for collimating light passing therethrough; and light diffusing means disposed between said light collimation means and said photosensitive element for duffusing and conducting light to said photosensitive element as an average quantity of light passing through a sample.

2. The optical detecting system of claim 1 wherein said collimation means are on said other side of said path; and said system further includes an optical filter interposed between said light source and said photosensitive element for permitting detection at only certain wavelengths.

3. The optical detecting system of claim 1 wherein said collimated means comprises a collimated hole structure, and said diffuser means comprises a light pipe.

4. The optical detecting system according to claim 1 wherein said photosensitive element has a light sensitive surface facing in a direction substantially transverse to the direction of the light passing through said collimation means.

5. A detecting system for coagulation time testing apparatus comprising: means defining a testing station for receiving a transparent, sample-containing cuvette; a light source located on one side of said station; a filter interposed between said station and said light source; mask means on the other side of said station to permit light passing through a cuvette from said light source to pass therethrough and to substantially prevent ambient light from passing therethrough; a diffuser adjacent said mask means; and a photosensitive element operatively associated with said diffuser for receiving filtered light from said light source passing through said sample, said mask and said diffuser, said diffuser diffusing light passing through said mask and conducting light to said photosensitive element as an average quantity of light passing through the sample, whereby a signal from said photosensitive element may be employed as indicative of a particular optical condition of the sample.

6. The detecting system of claim 5 wherein said filter is a red, high pass filter.

7. The detecting system of claim 5 wherein said diffuser comprises an elongated light pipe and said photosensitive element is arranged transversely to the elongated axis of said pipe.

8. The detecting system of claim 7 wherein said mask means comprises a collimated hole structure.

9. A detecting system for a testing device comprising: means defining a testing station for receiving a transparent sample-holding container; a light source located on one side of said station, said light source including a bulb having an integral lens directed toward said station whereby a beam of light comprised of a plurality of substantially parallel rays is directed toward said station; a mask on the other side of said station aligned with said beam, said mask comprising a collimated hole structure; a diffuser adjacent said mask for diffusing light from said source passing through said mask; and a photosensitive element optically associated with said diffuser for sensing the quantity of light passing through said sample, said diffuser acting to conduct light to said photosensitive element as an average quantity of light passing through a sample at the testing station whereby localized variations in the optical conductivity of the sample are averaged to eliminate the effects of optical noise.

10. The optical detecting system of claim 9 wherein said diffuser comprises an elongated light pipe and said photosensitive element faces a side of said light pipe.

* * * * *

PO-1050
(5/69)

UNITED STATES PATENT OFFICE
CERTIFICATE OF CORRECTION

Patent No. 3,754,866        Dated August 28, 1973

Inventor(s) David Alan Ritchie and Richard A. Reeves

It is certified that error appears in the above-identified patent and that said Letters Patent are hereby corrected as shown below:

In the claims:

Insert the word "after" in column 14, line 24, after "sample".

Signed and sealed this 27th day of November 1973.

(SEAL)
Attest

EDWARD M. FLETCHER, JR.      RENE D. TEGTMEYER
Attesting Officer              Acting Commissioner of Patents